UNITED STATES PATENT OFFICE.

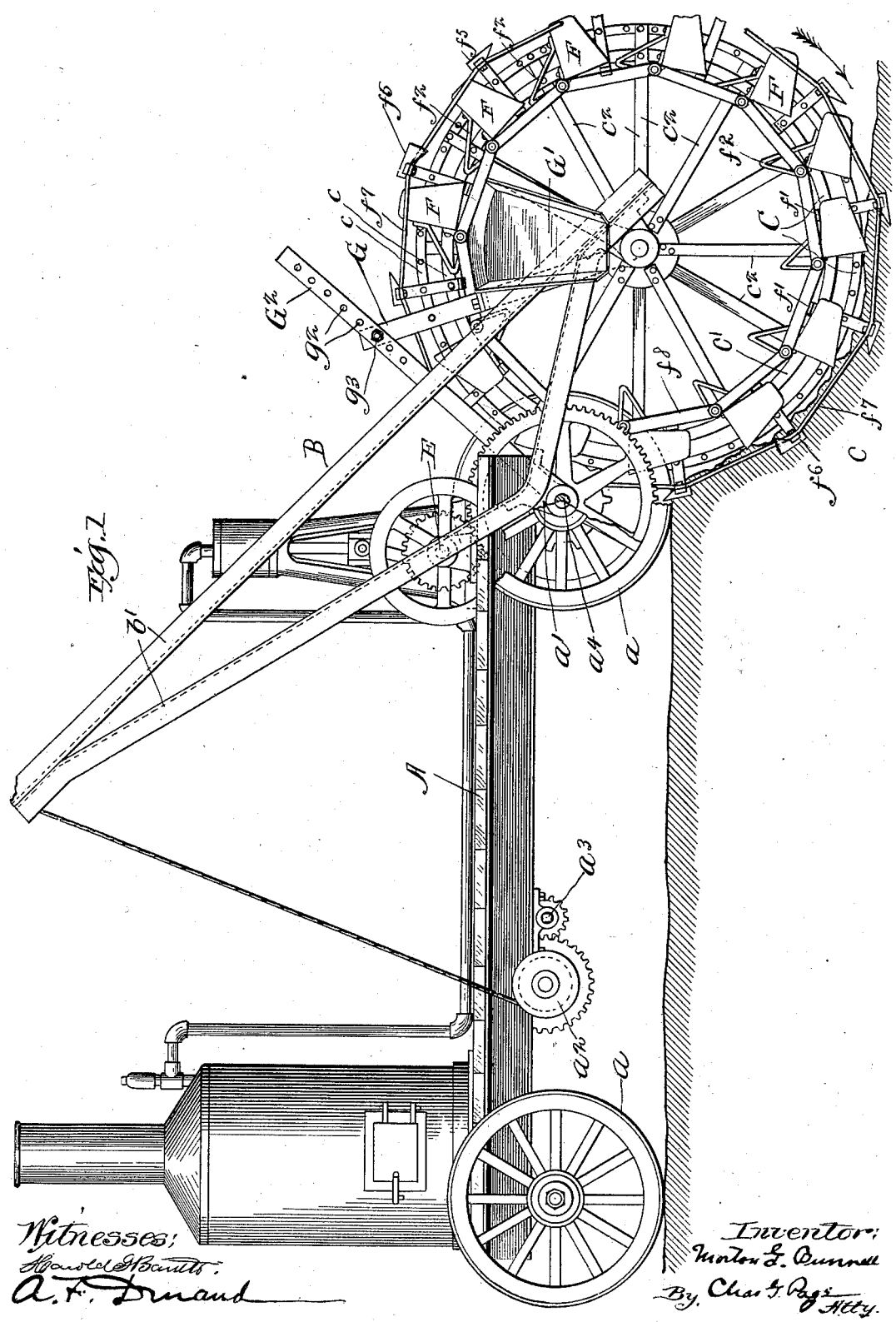

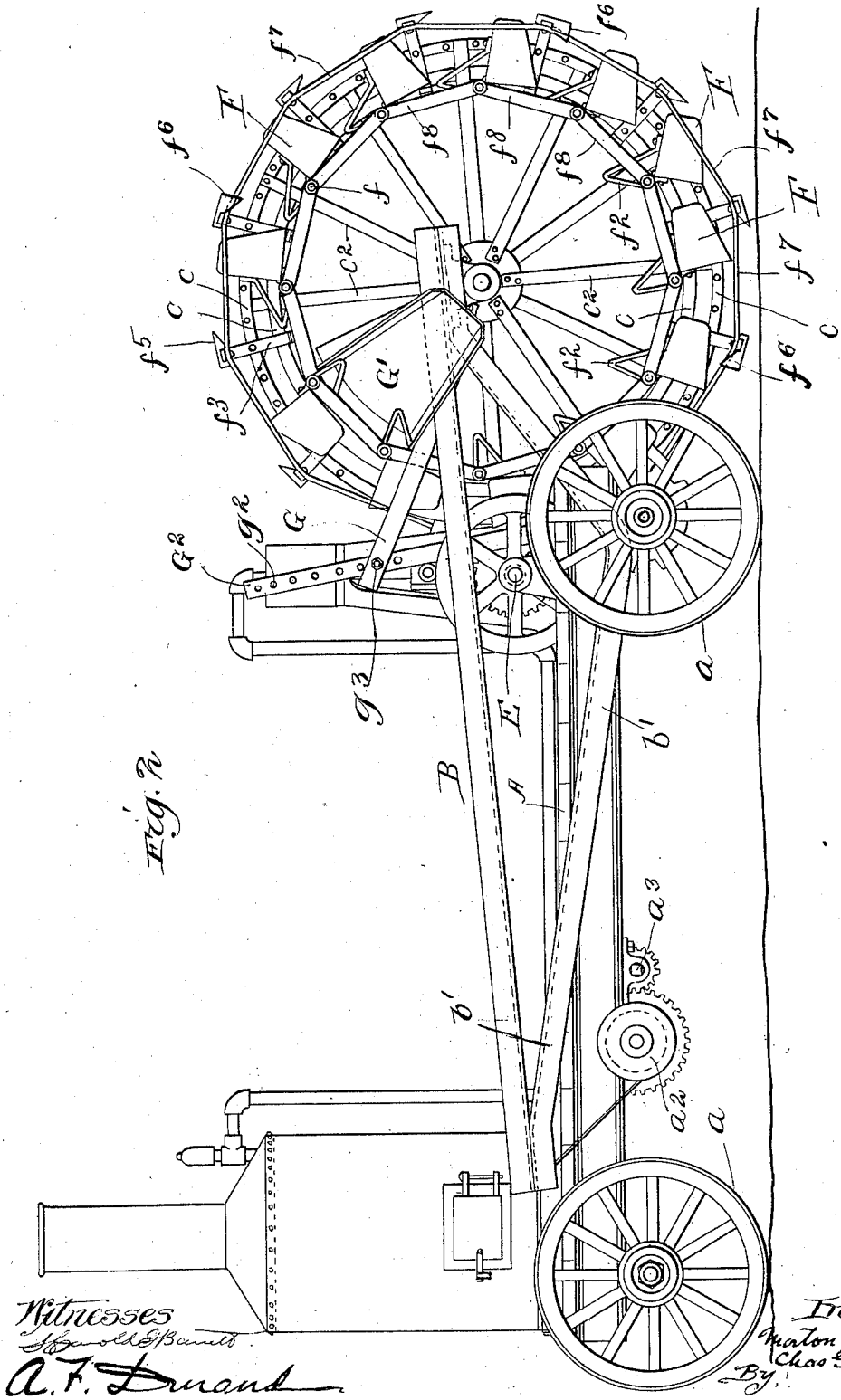

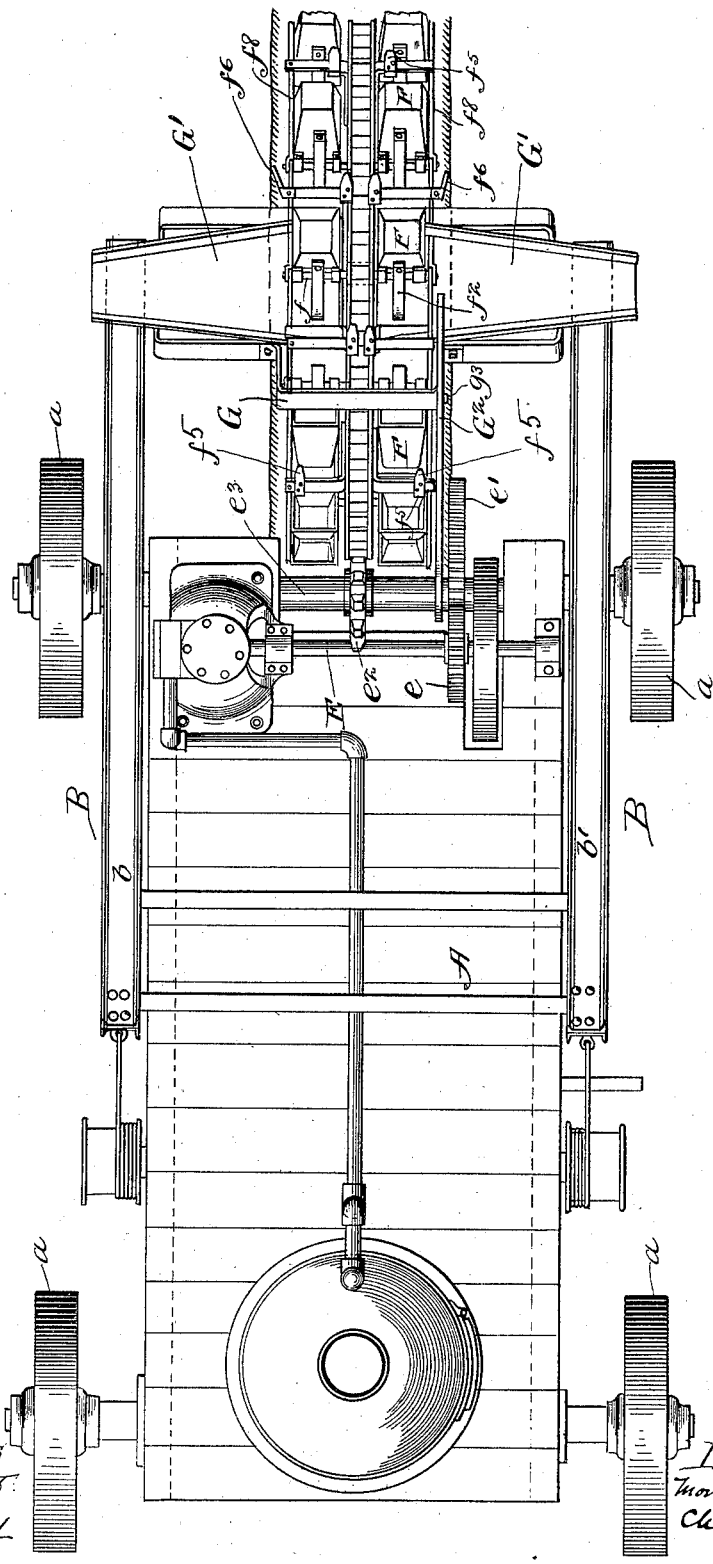

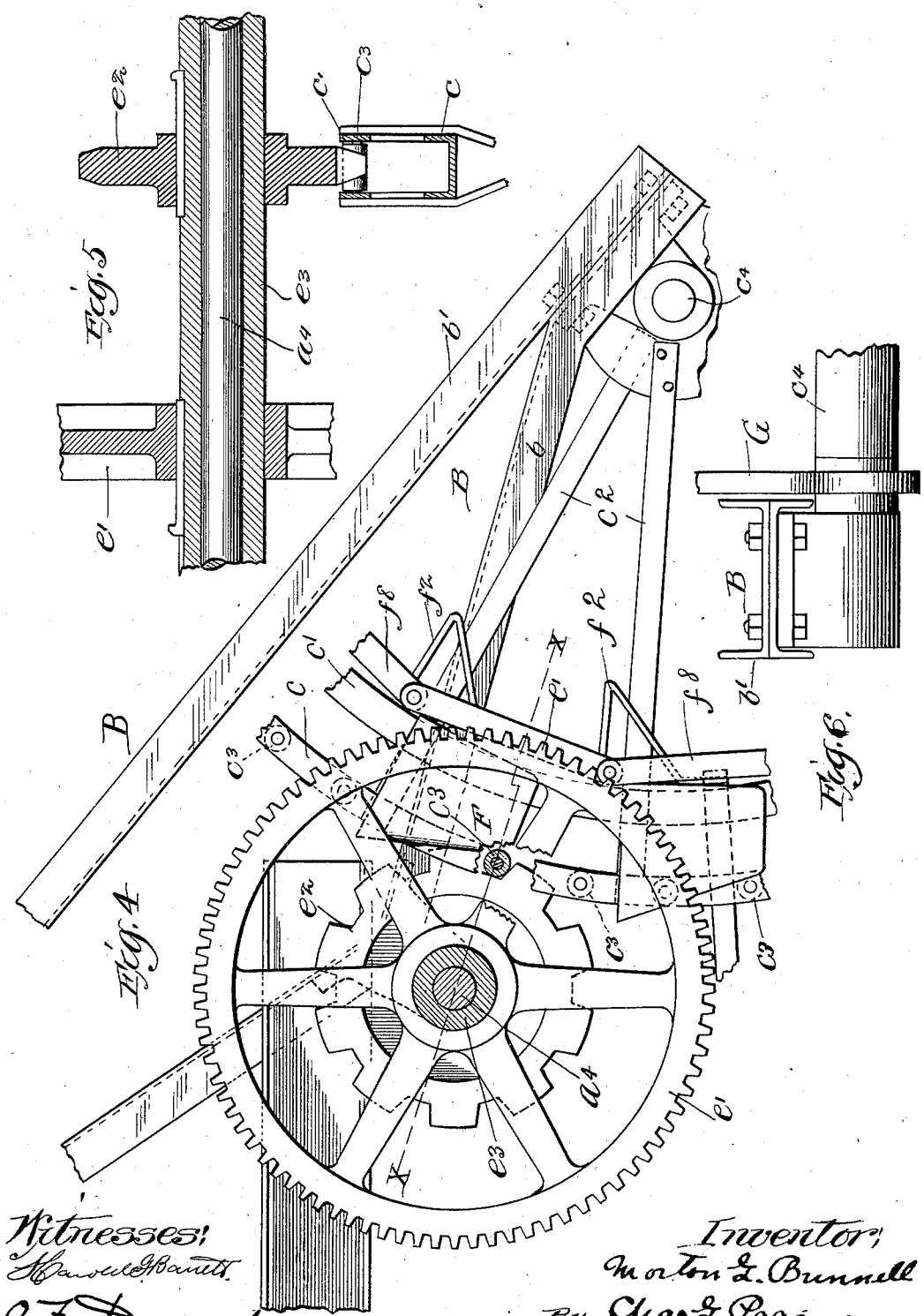

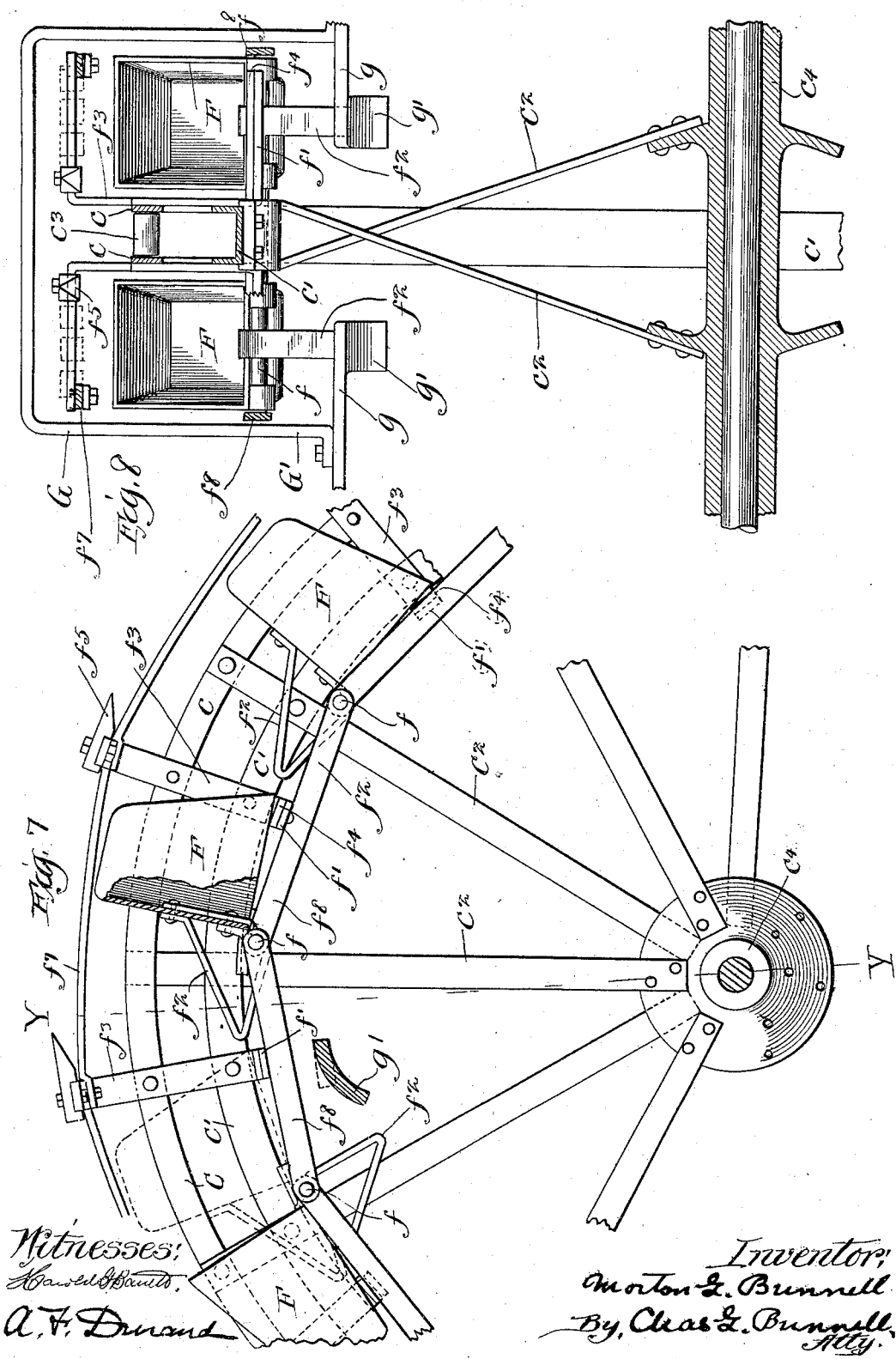

MORTON G. BUNNELL, OF CHICAGO, ILLINOIS, ASSIGNOR TO FREDERICK C. AUSTIN, OF SAME PLACE.

DITCHING-MACHINE.

SPECIFICATION forming part of Letters Patent No. 647,473, dated April 17, 1900.

Application filed May 11, 1899. Serial No. 716,390. (No model.)

*To all whom it may concern:*

Be it known that I, MORTON G. BUNNELL, a citizen of the United States, residing at Chicago, in the county of Cook and State of Illinois, have invented a certain new and useful Improvement in Ditching-Machines, of which the following is a specification.

My invention relates to a class of ditching-machines particularly adapted for making narrow trenches and commonly known as "tile-ditchers and sewer-builders."

The objects of my invention are to provide a strong, simple, serviceable, and easily-operated ditching-machine and to thereby facilitate the operations of laying tile and building sewers, to provide a practical construction of ditching-machine involving a series of traveling buckets which are successively filled at the lowest point in their path of travel and which are then automatically tripped or upset at a point above for the purpose of discharging their loads, to trip or upset the buckets in such manner that the dirt will be instantly discharged therefrom, to facilitate the filling of the buckets by providing suitable means for loosening or stirring up the soil, to provide a machine capable of making trenches of various depths, to secure greater rigidity, to insure against clogging, to reduce the cost of manufacture, to simplify and improve the driving mechanism to reduce friction, and to provide certain details and features of improvement tending to increase the general efficiency of machines of this class.

To the attainment of the foregoing and other useful ends the buckets may be arranged about the periphery of a wheel mounted for rotation about a horizontal axis. As a simple and advantageous arrangement, the wheel thus equipped with buckets can be provided peripherally with teeth, cogs, or the like, and by so doing a pinion having suitable connection with the driving-shaft may be arranged in gear with and employed to rotate the bucket-wheel. The buckets may be automatic in their action—that is to say, the buckets may be automatically tripped or upset for the purpose of discharging their loads, and, as a matter of special improvement, such tripping or upsetting can be terminated with a shock or impact of sufficient force to insure an instantaneous and thorough dislodgment of the soil from the buckets. The filling of the buckets may be facilitated by providing the periphery of the bucket-wheel with a number of knives or projections adapted to stir up and loosen the soil. The wheel upon which the buckets are mounted can be supported for a substantially-vertical adjustment and with this arrangement trenches or ditches can be made of various depths. A material reduction of friction may be secured by providing the bucket-wheel with small rolls in place of teeth or cogs, and this will also tend to prevent clogging. The buckets may be arranged in a double row about the periphery of the bucket-wheel, and by providing a couple of opposite and laterally-extending troughs or spouts the dirt taken up by the buckets can be discharged at each side of the trench or ditch.

Various other advantages and matters of improvement will hereinafter more fully appear.

In the accompanying drawings, Figure 1 represents in side elevation a ditching-machine constructed in accordance with my invention and showing the bucket-wheel in a lowered or working position. Fig. 2 is also a side elevation, but showing the bucket-wheel in an elevated or inoperative position. Fig. 3 is a plan of the machine shown in Fig. 1. Fig. 4 is a view, on a larger scale, illustrating the method of driving the bucket-wheel. Fig. 5 is a section on line $x\,x$ in Fig. 4. Fig. 6 is a detail view illustrating the construction of the tilting frame which supports the bucket-wheel. Fig. 7 is a view, on the same scale as Fig. 4, of a portion of the bucket-wheel and illustrating the manner in which the buckets are tripped or upset. Fig. 8 is a section on line $y\,y$ in Fig. 7.

A ditching-machine constructed in accordance with my invention comprises in general a platform or body-frame A, preferably mounted upon vehicle-wheels $a$ and adapted to support an engine and a boiler, a tilting frame B, arranged, preferably, to tilt about the rear journal or axle, and a bucket-wheel C, supported at the rear end of the tilting frame B, and gear connected with the driving-shaft of the engine. The said body-frame or platform may be constructed in any suitable manner, and the boiler and engine can be supported, respectively, at front and rear ends thereof. Various constructions may also be adopted for the tilting frame B; but as a preferred arrangement I construct the same of a couple of parallel and oppositely-arranged trusses $b\ b'$, suitably connected at their forward ends to form a frame and preferably arranged outside of the body-frame to permit a free tilting action. The tilting frame may be arranged to tilt about the rear journal or axle $a'$ as an axis, and for this purpose each truss can be provided with a casting or bearing-block $b'$, adapted to turn upon the said journal or axle. Each truss may be composed of a couple of channel-irons bolted or riveted together substantially in the manner shown in Figs. 1, 4, and 6, though it is of course obvious that the construction of the tilting frame can be modified according to requirements and without in any way departing from the spirit of my invention. As a simple arrangement for tilting the frame B, and thereby raising and lowering the bucket-wheel, I connect the forward end of the said frame by means of ropes, chains, or other suitable connectors with one or more winding-drums $a^2$, journaled in boxes on the under side of the body-frame. The said drums may be rotated in any suitable manner—as, for instance, by gear connecting the drum-shaft with a shaft $a^3$, having its end squared in the well-known manner to receive a crank, and with such arrangement it is obvious that the frame B can be tilted readily by hand and the bucket-wheel in this way adjusted for any depth of trench, and while the said bucket-wheel may for the broader purposes of my invention be of any ordinary construction and connected in any suitable manner with the driving-shaft of the engine I prefer to adopt a form of wheel commonly known as a "lantern-wheel" or "wallower" and to connect such wheel with the driving-shaft by means of suitable gears or pinions. Accordingly I construct the bucket-wheel of a couple of rings $c\ c$ and an annular channel-iron $c'$, the two rings being arranged side by side and concentric to the annular channel-iron and the spokes $c^2$, which connect the outer portion of the wheel with the hub, being preferably crossed in the manner shown in Fig. 8. A plurality of small rolls or trundles $c^3$ may be mounted between the two rings $c\ c$, and the hub $c^4$ can be extended at either side to give additional strength and stability. The engine-shaft E is preferably gear-connected with the bucket-wheel through the medium of gears $e\ e'$ and a pinion $e^2$, and as a matter of special improvement the gear $e'$ and the pinion $e^2$ are keyed to a sleeve $e^3$, mounted for rotation upon the rear journal or axle $a^4$. (See Figs. 4 and 5.) In this way the lantern-wheel or wallower can be rotated at will, the teeth on the pinion $e^2$ being adapted to mesh with and engage the trundles $c^3$ on the said wallower, and in this connection it will be observed that the pinion $e^2$, by reason of its teeth being embraced at either side by the rings or annular side flanges $c\ c$, tends to oppose and prevent lateral shift or side play on the part of the bucket-wheel. In other words, the teeth of the pinion are preferably of a width to prevent lateral shift or side play on the part of the wallower. As previously stated, the buckets F can be arranged in a double row about the rim or periphery of the lantern-wheel or wallower, a preferred arrangement being to provide the wheel with a number of short shafts or arbors $f$ and to mount the buckets in pairs upon the said arbors—that is to say, one at each side of the wheel—substantially as illustrated in Fig. 8. Each bucket thus pivotally mounted upon the wheel will be free to swing about its shaft or arbor as an axis, and by referring to Fig. 7 it will be seen that the wheel also is provided with stops $f'$, which alternate with the buckets and which serve to limit the swing of each bucket to what is approximately a quarter-turn. It will also be observed that each bucket is provided with an arm $f^2$ and that the bail G is constructed with a couple of opposite and inwardly-projecting tripping-arms $g$. These tripping-arms are preferably provided with curved portions $g'$, which are directly in the path of the arms $f^2$ on the buckets, and the opposite and laterally-projecting troughs G' are also preferably secured to and supported by the said bail. The stops $f'$, which limit the swing of the buckets, may be conveniently provided by bending out the inner end portions of the bars $f^3$, and these laterally-projecting inner end portions can be provided with strips of wood $f^4$, or similar material, adapted to afford suitable surfaces for receiving the impact of the buckets when the latter are tripped or upset by the arms $g$. It is also desirable to make some provision for stirring up or loosening the soil, so as to facilitate the filling of the buckets, and to such end the outer end portions of the bars $f^3$ can be bent outwardly, like their inner ends, and these laterally-projecting outer end portions may be provided with the tooth-shaped knives or cutters $f^5$. The length of the bars $f^3$ is preferably such that the said knives or cutters extend radially beyond the buckets, so as to loosen the dirt in advance of the latter, (see Fig. 1,) and it will also be observed that the knives or cutters are not in line circumferentially or, in other words, that the members of each pair of these tooth-shaped cutters are either a little nearer or a little farther apart than those of the preceding pair, the object being to insure a thorough loosening of the soil for the full width of the buckets. (See Figs. 3 and 8.) Each side of the wheel is also preferably provided with knives $f^6$, which extend laterally beyond the sides of the wheel, (see Fig. 3,) and these knives can also be mounted upon the laterally-projecting outer end portions of the bars $f^3$. The knives $f^5$ tear up or loosen the soil for the buckets, while the knives $f^6$ pare or shave the sides of the trench, and thus keep the latter of sufficient width to prevent the wheel from binding. The ends of the knife-supports can be tied together by means of rods or bars $f^7$, and the ends of the shafts or arbors upon which the buckets are mounted may be connected in a similar manner by means of bars $f^8$. With this arrangement the dirt loosened or torn up by the knives or cutters will be scooped up by the buckets, the bucket-wheel being rotated in the direction indicated by the arrow in Fig. 1, and each bucket when tripped or upset by reason of its arm $f^2$ striking one of the arms $g$ will discharge its load or contents into one of the laterally-projecting troughs G'. Each bucket, as soon as it strikes the soil, will swing back until it bears against the stop immediately in its rear, and will remain in such position until its arm strikes the curved portion $g'$ of the tripping-arm $g$, when it will be swung over or upset in such manner as to strike the stop immediately in front of it. The impact of the mouth of the bucket upon the strip of wood $f^4$ will tend to dislodge the dirt from the bucket and in such way to insure an instantaneous discharge therefrom regardless of the character of the soil in which the machine is working. In this way, therefore, it will be seen that in upsetting the lip of each bucket is brought violently into contact with a stop, which then serves to hold the bucket in an inverted position and that for this reason the discharge from each bucket is prompt and practically simultaneous with its upsetting; and while the curvature of the portions $g'$ of the tripping-arms will permit the initial movement of the buckets in upsetting to be comparatively slow, so as to avoid shock and liability of breakage, the arrangement is such that the movement will be accelerated sufficiently to cause the buckets to strike the stops with the requisite amount of force. Variations in the depth of the trench or ditch may be obtained by tilting the frame B about its axis, so as to either raise or lower the bucket-wheel, and it is with reference to such adjustment of the latter that the bail G, which supports the troughs G', is preferably arranged to swing about the axis of the bucket-wheel—that is to say, the bail—and consequently the troughs and tripping-arms are adjustable relatively to the tilting frame B and can therefore be maintained at a point directly above the axis of the wheel, regardless of the depth at which the latter is working. As a simple and effective arrangement for locking the bail when the same is adjusted to the proper position I provide an arm $G^2$, arranged to swing about the rear axle or journal $a^4$ and having its distal end portion adjustably connected with the upper part of the said bail. The adjustable connection between the swinging arm and the bail may be of any form, but preferably consists in providing the arm with a series of bolt-holes $g^2$. With this arrangement the bucket-wheel may be adjusted vertically, and the bail can then be adjusted accordingly. For instance, should it be found desirable to elevate the wheel from the position shown in Fig. 1 the attendant will first rotate the drums $a^2$ so as to partially wind up the connecting-cables, and will then loosen the locking-bolt $g^3$ for the purpose of permitting the bail to be swung rearward to an extent to bring the troughs over the axis of the wheel. The bail can then be locked in such position by reinserting the locking-bolt in the bail and through the proper hole in the arm $g^2$. Any known or suitable means may be employed for moving the machine forward in the direction desired for the excavation, and the dirt thrown up as a result of the rotary and progressive movement of the bucket-wheel may be discharged either into wagons or simply onto the ground at each side of the trench.

What I claim as my invention is—

1. A ditching-machine comprising a series of traveling buckets and a plurality of stops, each bucket being provided with a suitable lip; said buckets being constructed and arranged to scoop up the soil at a point in the lowest portion of their path of travel and to upset at a point above for the purpose of discharging their loads; and the upsetting of each bucket being accompanied by a shock or impact by reason of its lip portion being brought into contact with a stop, substantially as and for the purpose set forth.

2. The combination of a stop and an excavating-bucket, said bucket being provided with a lip adapted to scoop up the soil and constructed and arranged to be upset at a suitable point for the purpose of discharging its load, the bucket when upset, and while in an inverted position, being subjected to a shock or impact by reason of its lip portion being brought violently into contact with said stop, substantially as and for the purpose set forth.

3. A ditching-machine comprising a wheel having a plurality of automatically tripped or upset excavating-buckets arranged about its periphery, each bucket being provided with a suitable lip for scooping up the soil, and each bucket, when upset and while in an inverted position, being subjected to a shock or impact by reason of its lip portion being brought into contact with a portion of the said wheel, substantially as and for the purpose set forth.

4. A ditching-machine comprising a suitably-driven wheel having a plurality of automatically tripped or upset excavating-buckets mounted thereon, each bucket being provided with a suitable lip or lip portion adapted to scoop up the soil; said wheel being also provided with a plurality of stops for limiting the movements of the buckets, each stop being adapted and arranged to engage the lip or lip portion of a bucket and the impact of the buckets against the stops, when upset, serving to dislodge the dirt, substantially as described.

5. A ditching-machine comprising a wheel having a plurality of excavating-buckets pivotally mounted thereon, and having also a number of stops arranged to limit the swing of the buckets; suitable means being provided for tripping or upsetting the buckets, and the impact of the buckets upon the said stops, in upsetting, serving to insure a complete and instantaneous dislodgment of the contents of the buckets.

6. A ditching-machine comprising a wheel having a plurality of excavating-buckets pivotally mounted thereon, and having also a plurality of stops for limiting the swing of the buckets; each bucket being provided with an arm, and suitable means being provided for intercepting said arms and thereby upsetting the buckets for the purpose of discharging their loads; and the impact of the buckets upon the said stops, in upsetting, serving to dislodge the dirt from the buckets, substantially as described.

7. A ditching-machine comprising a wheel having a plurality of excavating-buckets pivotally mounted thereon, and having also a plurality of stops for limiting the swing of the buckets; each bucket being provided with an arm, and one or more tripping-arms being arranged to intercept the bucket-arms and thereby upset the buckets for the purpose of discharging their loads; and the impact of each bucket against a stop, in upsetting, serving to dislodge the soil from the bucket, substantially as described.

8. A ditching-machine comprising a vertically-adjustable wheel provided with a plurality of pivotally-mounted buckets, and having also a number of stops for limiting the swing of the buckets; each bucket being provided with an arm, and a stationary tripping-arm being arranged to intercept the bucket-arms and thereby trip or upset the buckets for the purpose of discharging their loads; the said tripping-arm being adapted to give the buckets an accelerated movement, and the impact of the buckets upon the stops serving to dislodge the soil from the buckets.

9. A ditching-machine comprising a vertically-adjustable wheel provided with a plurality of pivotally-mounted buckets, and having also a plurality of wood-faced stops for limiting the swing of the buckets; each bucket being provided with an arm, and a stationary tripping-arm being arranged in the path of the bucket-arms; the said tripping-arm having an intercepting portion adapted to give the buckets an accelerated movement, in upsetting, and the impact of the buckets upon the stops at such time serving to dislodge the dirt from the buckets.

10. A ditching-machine comprising a wheel provided with a double row of excavating-buckets, and having also a number of stops for limiting the swing of the buckets; means for rotating the wheel; and a couple of oppositely-arranged and laterally-extending troughs for receiving the dirt from the buckets, the impact of the buckets upon the stop, in upsetting, serving to insure a dislodgment of the dirt from each bucket while the latter is above one of the said troughs.

11. A ditching-machine comprising a vertically-adjustable wheel provided with a double row of excavating-buckets which are adapted to scoop up the soil at a point in the lower portion of their path of travel and which are automatically tripped or upset at a point above for the purpose of discharging their loads; means for rotating the said wheel; means for adjusting the wheel; and a couple of oppositely-arranged and laterally-extending troughs for receiving the dirt from the buckets, each bucket when upset being subjected to a shock or impact for the purpose of dislodging its contents.

12. A ditching-machine comprising a body-frame; a supplemental tilting frame; a wheel mounted at one end of said tilting frame and provided with a double row of excavating-buckets; a couple of adjustable troughs arranged at opposite sides of the said wheel, and mounted to swing about the axis of the latter; and means for locking the troughs and tilting frame against relative shift.

13. A ditching-machine comprising a wheel mounted upon a couple of swinging arms and provided with a plurality of excavating-buckets which are adapted to scoop up the soil at a point in the lower portion of their path of travel and which are automatically tripped or upset at a point above for the purpose of dumping their loads; means for swinging the said arms about their points of connection with the body-frame, so as to adjust the wheel in a substantially-vertical direction; means for rotating the wheel; an adjustable tripping device for tripping or upsetting the buckets, the said device being mounted to swing about the axis of the wheel; and means for locking the tripping device and the said swinging arms against relative shift.

14. A ditching-machine comprising a body-frame; a supplemental tilting frame; a wheel mounted at one end of said tilting frame and provided with a plurality of excavating-buckets; a bail arranged to swing about the axis of said wheel; one or more devices mounted upon said bail and adapted to receive and dispose of the dirt discharged from the buckets; means for locking the said bail and the tilting frame against relative shift; means for tilting the said tilting frame for the purpose of adjusting the wheel in a substantially-vertical direction; and means for rotating the said wheel.

15. A ditching-machine comprising a body-frame; a supplemental tilting frame; a wheel mounted at one end of said tilting frame and provided with a double row of buckets; a bail arranged to swing about the axis of said wheel; a couple of oppositely-arranged and laterally-extending troughs mounted upon said bail and arranged to receive and dispose of the dirt discharged from the buckets; a swinging arm having an adjustable connection with the upper portion of said bail and whereby the latter and the tilting frame may be locked against relative shift; means for tilting the said tilting frame for the purpose of adjusting the wheel; and means for rotating the said wheel.

16. A ditching-machine comprising a body-frame; a tilting frame; a bucket-wheel mounted at the overhanging end of said tilting frame; a bail arranged to swing about the axis of the bucket-wheel; a couple of oppositely-arranged and laterally-projecting troughs for receiving the dirt from the buckets; an arm arranged to swing about an axis coincident with the axis of the tilting frame, and having its free end portion adjustably connected with the upper portion of the said bail; means for tilting the said tilting frame for the purpose of adjusting the wheel; and means for rotating the wheel.

17. A ditching-machine comprising a pair of swinging arms; a wheel mounted at or near the free ends of said arms and provided with a plurality of automatically tripped or upset excavating-buckets; a bail arranged to swing about the axis of the wheel and provided with means for tripping the buckets; a couple of troughs or the like mounted upon the said bail and adapted to receive and dispose of the dirt discharged from the buckets; a swinging arm having an adjustable connection with the upper portion of the bail and whereby the latter and the arms which support the wheel may be locked against relative shift; and means for rotating the said wheel.

18. A ditching-machine comprising a lantern-wheel or wallower provided with excavating-buckets, and having a flange at either side of its trundles, and suitable spur-gearing for rotating said wallower, the teeth of said gearing which engage said wallower being of a width to fit between said flanges and thereby prevent lateral shift or play on the part of the said wallower, substantially as described.

19. A ditching-machine comprising a lantern-wheel or wallower provided with a plurality of buckets which are adapted to scoop up the soil and which are automatically tripped or upset for the purpose of discharging their loads; and a pinion or spur-wheel for rotating the said wallower, the teeth of said pinion being embraced by the annular rings or side flanges of said wallower, substantially as and for the purpose set forth.

20. A ditching-machine comprising a lantern-wheel or wallower having rolls which serve as trundles and also provided with a plurality of excavating-buckets; and a pinion or spur-wheel for rotating the said wallower, the rings or annular side flanges of said wallower embracing the sides of said pinion, substantially as and for the purpose set forth.

21. A ditching-machine comprising a lantern-wheel or wallower arranged to swing about an axis and provided with excavating-buckets; and a pinion or spur-wheel for rotating the said wallower and having an axis coincident with the axis about which the wallower swings.

22. A ditching-machine comprising a gear-wheel provided with excavating-buckets and arranged to swing about the rear axle; a pinion mounted upon said axle and arranged to engage the gear-wheel; and means for rotating the pinion for the purpose of rotating the gear-wheel.

23. A ditching-machine comprising a lantern-wheel or wallower provided with excavating-buckets and arranged to swing about the rear axle; a pinion or spur-wheel mounted upon said axle; and means for rotating the spur-wheel for the purpose of rotating the wallower.

24. A ditching-machine comprising a lantern-wheel or wallower provided with excavating-buckets and arranged to swing about the rear axle; a long sleeve loosely mounted upon said axle; a spur-wheel or pinion mounted upon said sleeve and arranged to engage said wallower; and means for rotating the pinion for the purpose set forth.

25. A ditching-machine comprising a wheel provided with excavating-buckets, and having also one set of knives for stirring up or loosening the soil and another set for paring or shaving the sides of the trench.

26. A ditching-machine comprising a wheel provided with automatically tripped or upset buckets, and also with a set of knives for loosening the soil and another set for paring or shaving the sides of the trench, substantially as described.

27. In a ditching-machine, a lantern-wheel or wallower provided with excavating-buckets and also with a set of knives for loosening the soil and a pinion for rotating the lantern-wheel, the teeth of said pinion being embraced at either side by the rings or annular side flanges of said wallower, substantially as described.

28. In a ditching-machine, a lantern-wheel or wallower provided with excavating-buckets and also with a set of knives for loosening the soil and another set for paring or shaving the sides of the trench or ditch.

29. In a ditching-machine, the lantern-wheel or wallower provided peripherally with a double row of automatically tripped or upset excavating-buckets, and having also an intermediate row or series of trundles.

30. In a ditching-machine, the combination of a series of traveling buckets which are adapted to scoop up the soil at a point in the lower portion of their path of travel and which are then tripped at a point above for the purpose of discharging their loads; a set of knives for stirring up or loosening the soil for the purpose set forth; and a set of knives for paring or shaving the sides of the trench to keep the buckets from binding therein.

31. In a ditching-machine, the combination of a body-frame; a supplemental tilting frame; a lantern-wheel or wallower mounted upon the overhanging end of said tilting frame; a plurality of excavating-buckets mounted upon said wallower; and a pinion or spur-wheel for rotating the wallower and having an axis coincident with the axis about which the tilting frame tilts.

MORTON G. BUNNELL.

Witnesses:
ARTHUR F. DURAND,
AGNES A. DEVINE.